United States Patent Office 3,301,788
Patented Jan. 31, 1967

3,301,788
PROCESS FOR PREPARING A DESICCANT PELLET
William P. Cummings, Severna Park, and Leon L. Baral and James A. Laudone, Baltimore, Md., assignors to W. R. Grace & Co., New York, N.Y., a corporation of Connecticut
No Drawing. Filed Mar. 26, 1964, Ser. No. 355,110
3 Claims. (Cl. 252—194)

This invention relates to desiccants embodying a molded composition having desirable adsorptive characteristics. The desiccant of the present invention is made up of two essential components, both components having desiccating properties. The two components are combined and a desiccant is prepared in the form of a pellet. This produces a desiccant pellet which is uniform in a size and shape having good overall moisture adsorption capacity at all levels of relative humidity and which is rugged enough to withstand severe mechanical abuses while in service.

The product of the instant application incorporates the best properties of the component desiccants to obtain a superior overall product. Our desiccant pellets have a wide range of uses. These pellets are of particular interest as desiccants for packaged materials. The pellets have the advantage of being practical for automatic machine insertion in jars containing the material to be protected. They can be placed in the jar cap itself or can be dropped into powders. Our novel materials are chemically inert and non-deliquescent. They pick up moisture and maintain the freshness of materials such as drugs, for example, and the free-flowing properties of powders. The pellets are miniature cylinders in shape and can be adjusted in size, within practical limits, to the requirements of any particular case.

The novel desiccant pellets of our invention are a combination of commercially available microselective adsorbents having desiccant properties and commercially available silica-alumina composites containing 13–25 and 27% alumina commonly sold as petroleum cracking catalysts. The microselective zeolites are a commercial product known as molecular sieves. These materials are identified and differentiated from each other on the basis of their pore size. We have found that the zeolite having a pore size of about 4 angstroms sold commercially as Z–12 zeolite gives particularly good results. We prefer to prepare our composite with this zeolite and the silica-alumina composite containing 13% active alumina. For purposes of simplicity, our invention will be described using these components.

The first step in preparing the product of our invention is the preparation of components. The Z–12 zeolite is a molecular sieve with a nominal four angstrom pore size. The method of preparing the zeolite is not part of this invention. This zeolite can be prepared in any one of several methods. One suitable method of preparing this product is described in application S.N. 158,895, filed December 12, 1961. Briefly, this process comprises the steps of calcining clay for a suitable time and at a suitable temperature to give the more reactive product, mixing the calcined clay with sodium hydroxide, aging the clay-sodium hydroxide mixture for the proper period of time followed by a hydrothermal conversion step.

The silica-alumina component is also an article of commerce. The method of preparing this material is not part of this invention. This material can be prepared using the process disclosed in U.S. Patent 2,886,512 to Winyall. Briefly, this process comprises: preparing a sodium silicate solution to have a silicate to soda ratio of about 3.3 to 1, gelling the silicate by addition of carbon dioxide, adding the gelled silicate to an alum solution containing sufficient alumina to provide 13% alumina in the final product followed by spray drying, washing and redrying steps. The pore volume of this component is critical. Satisfactory results are obtained when the pore volume is in the range of 0.7 to 0.80 cc./g., preferably about 0.77 cc./g.

In preparing the molecular sieve component for use in the process of the instant application, the powdered component may be balled with water. This converts the fine powdered material into particles of a larger size. If this step is used, these small nodules are then crushed and mixed with the silica-alumina component. The silica-alumina component is a finely divided material having an average size of about 55 microns.

In preparing the product of the instant application, the relative percentage of the components is critically important. The molecular sieve component is present in an amount equal to 40 to 70%, preferably about 45 to 55%. The balance of the composition is the silica-alumina component.

After the components are thoroughly mixed, a commercial pilling aid, such as polyvinyl alcohol, molasses, sugar solution, graphite, altagel (an inorganic clay-type material) and the powdered animal fat compositions sold under the trade name Sterotex is added. We have found that satisfactory results can be obtained when about 3 to 8% of one of these pilling aids is mixed with the components prior to the pilling.

The composition of the mixture prior to pilling is important in that the mixture must have the proper consistency to obtain a pill with the desirable attrition properties. We have found that satisfactory results are obtained when a composite containing water, 4% polyvinyl alcohol, 2% Sterotex and the balance being the two components, is subjected to mechanical pilling.

In the next step of our process, the product is activated by the calcination to remove the moisture and to burn off the organics added to prepare the pill. We have found that satisfactory results are obtained when the pills are activated at a temperature of 500 to 1100° F. For a period of 2 to 5 hours, particularly good results are obtained when the pills are heated to 700 to 1050° F. for a period of about 3 hours. The product recovered from this process is then ready for use as a desiccant. If desirable, the product may be colored using any of the commercially available dyes.

Our product is available in pellets of any size requested by the user. It is convenient to prepare pellets of $\frac{1}{8}''$ to $\frac{1}{2}''$ in diameter and a particularly attractive pellet is the pellet $\frac{3}{8}''$ x $\frac{3}{8}''$ in diameter, which weighs 0.675 gram.

Our invention is further illustrated by the following specific but non-limiting examples.

EXAMPLE I

This example illustrates the preferred method of preparing the desiccant of our invention.

In this run a 50 gram portion of a molecular sieve component and 50 grams of a silica-alumina cracking catalyst containing 13% alumina, were mixed together. After the components were mixed thoroughly, 4 grams of polyvinyl alcohol and 2 grams of the commercially available animal fat pilling aid sold under the trade name of Sterotex per 100 grams of the dry powder, were added. The product was formed into $\frac{5}{16}''$ x $\frac{1}{4}''$ pills in a standard pilling machine. The pills were then activated by heat at a temperature of 1050° F. for 3 hours. The desiccant properties of this material are set out in Example IV below.

EXAMPLE II

The process of Example I was repeated with the exception that graphite was substituted for the animal fat pilling aid.

The method of preparing this desiccant was the same as Example I in that 50 grams of the silica-alumina component and 50 grams of the molecular sieve component were mixed. After mixing, 4 grams of polyvinyl alcohol and 2 grams of graphite were added and the composite pilled. The pills were activated by heat at a temperature of 700° F. for a period of 3 hours. The product had desiccant properties similar to the product of Example I.

EXAMPLE III

This example illustrates the method of preparing the desiccant product of our invention using the balling technique. In this process, a quantity of molecular sieves with a nominal four angstrom pore size was balled with 13 ml. of water per 100 grams of molecular sieves. These spheres were dried, crushed and mixed thoroughly with the silica-alumina component. A 50 gram portion of the molecular sieve component and 50 grams of a silica-alumina component containing 13% alumina were mixed together in preparing the composition. After the components were mixed thoroughly, 4 grams of polyvinyl alcohol per hundred grams of the dry powder were added, along with 2 grams of the commercially available animal fat pilling aid sold under the tradename of Sterotex. The product was formed into 5/16" x 1/4" pills in a standard pilling machine. The pills were then activated by heat at a temperature of 1050° F. for 3 hours. The product had a faint yellow tinge. The product had desiccant properties similar to the product of Example I.

EXAMPLE IV

The adsorbent capacity of the desiccants was measured at 10, 20, 40, 60 and 80% relative humidity. The percent relative humidity is controlled by passing air at a pressure of less than 1 mm. of mercury and at a temperature of 77°±1° F. through a sulfuric acid solution. The relative humidity of the air is controlled by controlling the concentration of the sulfuric acid in the solution. The relationship between the relative humidity of the air and concentration of the sulfuric acid is set out in the table below.

*Table I*

| Percent relative humidity: | Percent H$_2$SO$_4$ |
|---|---|
| 10 | 64.7 |
| 20 | 58.2 |
| 40 | 47.8 |
| 60 | 38.4 |
| 80 | 26.2 |

In determining the adsorptive capacity of the materials, the sample is placed in the Nesbitt, Fleming or other standard form adsorption bulb. The inlet air and the sulfuric acid solution are equalized at temperature of 77±1° F. The adsorption bulb is tightly packed with about a 1" layer of Pyrex glass wool and a 6 gram sample of the desiccant is weighed accurately into the tared adsorption bulb. This is done in a minimum of time to reduce exposure of the sample to the air. The adsorption bulb is connected to the apparatus and the air flow adjusted to 4 meters per minute. The manometer in the system indicates the pressure of the air and this pressure is adjusted to less than 1" of mercury and is maintained at less than 1" of mercury throughout the duration of the test. The rate of flow of the air through the sample is checked periodically by observing the readings of the flowmeter in the system. The adsorption bulb is removed at 6 hours and weighed. The bulb is placed back in the adsorption train for two additional hours when it is again weighed. The weighings are repeated at two hour intervals until two successive weighings show a weight gain of less than five milligrams. The results are calculated using the following formula:

$$\frac{\text{Total gain in weight} \times 100}{\text{weight of sample}} =$$

water adsorbed percent of weight

The adsorptive capacity of the product of our invention was determined using 5/16" x 1/4" pills which weighed approximately 0.325 gram each. The pills were composed of a 50–50 mixture of powder Z–12 type sodium molecular sieves and the silica-alumina component contained 13% alumina. The adsorptive capacity was 77° F. in equilibrium with air at various relative humidities which are set out in the table below:

*Table II.—Adsorptive capacities at 77° F.±1°*

| Percent relative humidity: | Percent adsorbed |
|---|---|
| 10 | 9.0 |
| 20 | 11.95 |
| 40 | 15.50 |
| 60 | 23.59 |
| 80 | 31.34 |

The improvement in the properties of the desiccant of the instant application is apparent when these values are compared with adsorptive capacity at various relative humidities of the individual components.

*Table III*

| Percent Relative Humidity | Percent Adsorbed | |
|---|---|---|
| | Molecular Sieve | Silica-Alumina |
| 10 | 18.25 | 3.75 |
| 20 | 19.15 | 5.35 |
| 40 | 20.25 | 10.50 |
| 60 | 20.50 | 20.0 |
| 80 | 20.50 | 35.0 |

The combination product has a much better adsorptive capacity at 60 and 80% relative humidity than the molecular sieve and at the same time it has a much better adsorptive capacity at 10, 20 and 40% relative humidity than the silica-alumina constituent. The product of our invention is thus a successful blending of the two products to produce a balanced desiccant of uniform shape having good attrition properties.

What is claimed is:
1. A process for preparing a desiccant pellet comprising a composite of a zeolitic molecular sieve having a pore size of about 4 Angstroms and a spray dried silica-alumina component containing about 13 to 27 percent alumina which comprises:
   (a) Forming the zeolitic component into nodules.
   (b) Crushing the nodular zeolitic component and mixing with the silica-alumina component to form a composite containing about 45 to 55 percent of the zeolite component.
   (c) Mixing the components with about 3 to 8 percent of a pilling aid selected from the group consisting of molasses, sugar solution, graphite, a polyvinyl alcohol solution and an inorganic clay and pilling.
   (d) Calcining at a temperature of about 500 to 1100° F. for about 2 to 5 hours.
   (e) Cooling and recovering the desiccant product pellet.

2. The process according to claim 1 wherein the spray dried silica-alumina component contains about 13 percent alumina, and is composed of particles having an average size of about 55 microns.

3. The process according to claim 1 wherein the composite is formed by mixing equal weights of the two components and the composite is mixed with about 4 grams of polyvinyl alcohol and 2 grams of graphite per 100 grams of composite prior to the pilling step.

References Cited by the Examiner

UNITED STATES PATENTS

| | | | |
|---|---|---|---|
| 1,682,588 | 8/1928 | Wietzel et al. | 252—194 X |
| 2,560,097 | 7/1951 | Emerson et al. | 252—174 |
| 3,140,249 | 7/1964 | Plank et al. | 252—455 X |
| 3,143,491 | 8/1964 | Bergstrom | 252—455 |
| 3,205,037 | 9/1965 | Maker et al. | 23—112 |
| 3,219,590 | 11/1965 | Ribaud | 252—455 X |
| 3,235,089 | 2/1966 | Burroughs | 252—194 |
| 3,239,471 | 3/1966 | Chin-Hu Ch'in et al. | 23—112 X |

FOREIGN PATENTS 622,273 6/1961 Canada.

OTHER REFERENCES

"Elvanol" Polyvinyl Alcohols, Du Pont 1951, page 22 relied on.

The Merck Index, 1940, 5th Ed. (page 260 relied on).

LEON D. ROSDOL, *Primary Examiner.*

M. WEINBLATT, *Assistant Examiner.*